(12) United States Patent
Shigihara et al.

(10) Patent No.: US 9,333,730 B2
(45) Date of Patent: May 10, 2016

(54) MANUFACTURING METHOD FOR COMPOSITE STRUCTURE

(71) Applicant: HONDA MOTOR CO., LTD., Tokyo (JP)

(72) Inventors: Tomohiko Shigihara, Tochigi (JP); Takayuki Hoshino, Tochigi (JP); Yosuke Ikadai, Tochigi (JP); Yuuki Kami, Tochigi (JP); Toshihiro Murakawa, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 82 days.

(21) Appl. No.: 14/057,595

(22) Filed: Oct. 18, 2013

(65) Prior Publication Data

US 2014/0110054 A1   Apr. 24, 2014

(30) Foreign Application Priority Data

Oct. 22, 2012  (JP) .................. 2012-232708
Apr. 12, 2013  (JP) .................. 2013-083902
Apr. 12, 2013  (JP) .................. 2013-083903
Jul. 24, 2013  (JP) .................. 2013-153665

(51) Int. Cl.
*B32B 37/04* (2006.01)
*B29C 65/00* (2006.01)
*B29C 65/36* (2006.01)
*B29C 65/78* (2006.01)

(52) U.S. Cl.
CPC ............. *B32B 37/04* (2013.01); *B29C 65/3616* (2013.01); *B29C 65/3668* (2013.01); *B29C 65/3676* (2013.01); *B29C 66/112* (2013.01); *B29C 66/114* (2013.01); *B29C 66/532* (2013.01); *B29C 66/72143* (2013.01); *B29C 66/7392* (2013.01); *B29C 66/73112* (2013.01); *B29C 66/73152* (2013.01);
(Continued)

(58) Field of Classification Search
CPC .................. B29C 66/91651; B29C 66/72143; B29C 66/112; B29C 66/114; B29C 66/532; B29C 66/742; B29C 66/8362; B29C 66/9192; B29C 66/91411; B29C 66/91443; B29C 66/91445; B29C 66/91921; B29C 65/3676; B29C 65/3616; B29C 65/3668; B32B 37/04
See application file for complete search history.

(56) References Cited

U.S. PATENT DOCUMENTS 1,900,842 A * 3/1933 Northrup ...................... 219/155
4,093,839 A * 6/1978 Moliterno et al. ............ 219/643
(Continued)

FOREIGN PATENT DOCUMENTS

JP   60-130664    7/1985
JP   2011-016275  1/2011

OTHER PUBLICATIONS

Japanese Office Action dated May 20, 2014, 2 pages.

*Primary Examiner* — Daniel McNally
(74) *Attorney, Agent, or Firm* — Rankin, Hill & Clark LLP (57) ABSTRACT

There is provided a manufacturing method for a composite structure that makes it possible to join a thermoplastic resin molding, which serves as a second member for reinforcement, while at the same time preventing the deformation of a first member to be reinforced. The second member contains magnetic substances in a portion thereof that is to be abutted on the first member. The second member is introduced into an induction heating unit and subjected to induction heating, thereby heating the abutting portion of the second member to join the second member to the first member.

13 Claims, 6 Drawing Sheets

(52) U.S. Cl.
CPC ........ *B29C 66/73921* (2013.01); *B29C 66/742* (2013.01); *B29C 66/8362* (2013.01); *B29C 66/9192* (2013.01); *B29C 66/91411* (2013.01); *B29C 66/91443* (2013.01); *B29C 66/91445* (2013.01); *B29C 66/91651* (2013.01); *B29C 66/91921* (2013.01); *B29C 65/7841* (2013.01); *B29C 66/4722* (2013.01); *B29C 66/7212* (2013.01)

(56) References Cited

U.S. PATENT DOCUMENTS

| | | | | |
|---|---|---|---|---|
| 5,916,469 | A | * | 6/1999 | Scoles et al. .................. 219/633 |
| 2009/0311506 | A1 | * | 12/2009 | Herbeck et al. ............ 428/297.4 |
| 2010/0065552 | A1 | * | 3/2010 | Matsen ............... B29C 35/0272 219/671 |

* cited by examiner

MANUFACTURING METHOD FOR COMPOSITE STRUCTURE

BACKGROUND OF THE INVENTION

1. Field of the Invention

The present invention relates to a manufacturing method for a composite structure.

2. Description of the Related Art

An auto exterior part, such as a fender or a roof of an automobile, is generally formed of a metal plate of steel or the like. It has been studied to make the metal plate thinner and lighter so as to improve fuel efficiency and reduce production cost.

However, making the metal plate thinner may fail to provide required stiffness. A possible preventive measure is to reinforce the metal plate by providing one surface thereof with a ribbed reinforcing member, which is made of a thermoplastic resin, thereby producing a composite structure to secure the stiffness of the metal plate.

As a manufacturing method for the composite structure, there has conventionally been known a method for pressing a ribbed reinforcing member, which is made of a thermoplastic resin, against a surface of a metal plate that has been heated by a heating apparatus. According to the manufacturing method, the heated metal plate is conveyed to a rib forming and pressing apparatus by a transfer robot, and the ribbed reinforcing member formed of a molten resin extruded from the rib forming and pressing apparatus is pressed against the surface of the metal plate by a pressing roller (refer to Japanese Patent Application Laid-Open No. 2011-16275).

According to the conventional manufacturing method, however, the ribbed reinforcing member molded from the molten resin is pressed against the metal plate by the pressing roller to form the composite structure, so that the molding mechanism inconveniently becomes complicated, depending on the shape of the reinforcing member. In addition, the ribbed reinforcing member has to be cooled and solidified, thus inconveniently slowing down the speed of forming the composite structure.

Further, in the conventional manufacturing method, the temperature of the heated metal plate decreases during the conveyance by the transfer robot, inconveniently leading to the occurrence of defective welding of the ribbed reinforcing member in some cases.

SUMMARY OF THE INVENTION

Accordingly, an object of the present invention is to provide a manufacturing method for a composite structure that allows a ribbed thermoplastic resin molding to be welded, as a reinforcing member, to the member to be reinforced.

Another object of the present invention is to provide a manufacturing apparatus suited to implement the manufacturing method.

To these ends, according to the present invention, there is provided a method for manufacturing a composite structure constituted of a plate-like first member and a ribbed second member, the method comprising: a step of introducing a thermoplastic resin molding into an induction heating apparatus, in which the thermoplastic resin includes an abutting portion, which is to be abutted on one surface of the first member, and contains a magnetic substance at least in the abutting portion, the thermoplastic resin molding constituting the second member; a step of heating the abutting portion by inductively heating the second member by the induction heating apparatus; and a step of leading the second member out of the induction heating apparatus and joining the second member to one surface of the first member at the abutting portion.

In the manufacturing method according to the present invention, first, the thermoplastic resin molding that contains magnetic substances at least in the abutting portion to be abutted on the first member, and which constitutes the second member, is introduced into the induction heating apparatus. In the manufacturing method according to the present invention, the second member may be a long body or may have a length required for reinforcing the first member.

Then, the second member is inductively heated by the induction heating apparatus so as to cause the magnetic substances contained in the second member to generate heat, thereby heating the abutting portion.

Subsequently, the second member having at least the abutting portion thereof heated is led out of the induction heating apparatus and joined to the first member at the abutting portion. This makes it possible to combine the second member and the first member into one piece, thus fabricating a composite structure having the second member on one surface of the first member.

In the manufacturing method according to the present invention, only the second member is heated by the induction heating apparatus, and the first member is not heated at all. Therefore, the manufacturing method according to the present invention makes it possible to prevent the first member from being deformed.

In the manufacturing method according to the present invention, the induction heating apparatus heats the abutting portion to a temperature range of not lower than the softening temperature and below the temperature of deterioration of the thermoplastic resin constituting the second member.

The induction heating apparatus is preferably composed of a plurality of induction heating units to heat the second member to a temperature within the foregoing temperature range. The induction heating apparatus constituted of the plurality of the induction heating units is capable of controlling the heating condition of the second member.

In order to control the heating condition of the second member, the plurality of the induction heating units preferably heats the second member, for example, at rates that differ from each other. The manufacturing method in accordance with the present invention combines the plurality of the induction heating units that heats the second member at rates that differ from each other, thus making it possible to control the heating rate in each of a low temperature range and a high temperature range, respectively, when heating the second member.

Further, when the plurality of the induction heating units heats the second member at rates that differ from each other, the plurality of the induction heating units is capable of heating the second member at a lower heating rate as the second member is closer to an end where the second member is introduced, while heating the second member at a higher heating rate as the second member is closer to an end where the second member is led out.

In this case, first, at the end where the second member is introduced, the second member is heated at a low heating rate up to the temperature range below the softening temperature of the thermoplastic resin but near the softening temperature thereof. As a result, the second member is preheated up to the temperature range near the softening temperature of the thermoplastic resin at the end where the second member is introduced.

Then, the second member is moved toward the end where the second member is led out, and the second member is heated at a higher heating rate up to the temperature range of not lower than the softening temperature of the thermoplastic resin and below the temperature of deterioration thereof. As a result, the second member is rapidly heated to the temperature range of not lower than the softening temperature of the thermoplastic resin and below the temperature of deterioration thereof at the end where the second member is led out. Hence, the heating time in the high temperature range can be shortened.

Further, the method for heating the second member as described above allows a large number of the second members to be heated at the same time at the end where the second members are led out. Thus, the method is ideally suited for the batch processing of the second members when the second members have a predetermined length.

In the manufacturing method according to the present invention, the second member is heated by causing the magnetic substances to generate heat by the induction heating apparatus. If, therefore, the induction heating apparatus heats the second member at an excessively high rate at the end where the second member is led out, then the temperature of the thermoplastic resin may continue to rise until the temperature of deterioration is reached after the second member is led out of the induction heating apparatus, thus causing the second member to develop deterioration.

Alternatively, therefore, when the second member is heated by the plurality of the induction heating units at rates that differ from each other, the plurality of the induction heating units may heat the second member at a higher heating rate as the second member is closer to the end where the second member is introduced, and may heat the second member at a lower heating rate as the second member is closer to the end where second member is led out.

In this case, first, at the end where the second member is introduced, the second member is heated at a high heating rate up to the temperature range below the softening temperature of the thermoplastic resin but near the softening temperature thereof. Then, the second member is moved toward the end where the second member is led out, and the second member is heated at a lower heating rate up to the temperature range of not lower than the softening temperature of the thermoplastic resin and below the temperature of deterioration thereof. As a result, the second member is slowly heated to the temperature range of not lower than the softening temperature of the thermoplastic resin and below the temperature of deterioration thereof at the end where the second member is led out.

Thus, the temperature of the second member can be further securely controlled to the temperature range of not lower than the softening temperature of the thermoplastic resin and below the temperature of deterioration thereof.

In the manufacturing method according to the present invention, the plurality of the induction heating units may be interconnected in series or in parallel. However, if the plurality of the induction heating units is interconnected in series, then the induction heating apparatus becomes long and massive, requiring a high voltage in some cases.

Hence, in the manufacturing method according to the present invention, the plurality of the induction heating units is more preferably interconnected in parallel. This makes it possible to prevent the total value of the inductances of the plurality of the induction heating units from becoming large, reducing the voltages applied to the plurality of the induction heating units. Hence, the second member can be heated to the temperature range of not lower than the softening temperature of the thermoplastic resin and below the temperature of deterioration thereof without using high voltages.

Further, in the manufacturing method according to the present invention, the entire second member may contain the magnetic substances and may have a two-layer structure in which a supporting member composed of a second thermoplastic resin molding is laminated on an abutting member which is composed of a first thermoplastic resin molding and which is to be abutted on the first member, and the abutting member may contain the magnetic substances. However, if the entire second member contains the magnetic substances, then more electric power may be required for heating.

Therefore, in the manufacturing method according to the present invention, further preferably, the thermoplastic resin molding has a two-layer structure in which the supporting member is laminated on the abutting member and the abutting member contains the magnetic substances. In this way, only the abutting member will be heated, permitting a reduction in the required electric power.

If the thermoplastic resin molding has the two-layer structure, then the abutting member is preferably composed of a thermoplastic resin molding that has higher plasticity than that of the supporting member. In the second member, the supporting member is composed of a thermoplastic resin molding which is relatively harder than that of the abutting member, so that when the abutting member is inductively heated to be weldable and softened, the shape of the abutting member can be maintained by the supporting member. Meanwhile, the abutting member is composed of a thermoplastic resin molding which has higher plasticity than that of the supporting member, so that the abutting member can be flexibly deformed when heated, thus allowing the abutting member to be easily and securely joined to the first member.

Further, the abutting member is formed of the first thermoplastic resin molding having higher plasticity than that of the supporting member, so that the abutting portion accommodates the difference in expansion coefficient between the second member and the first member, thus making it possible to prevent the second member from coming off from the first member. However, if the magnetic substances are evenly contained in the entire abutting member, then the abutting member that becomes flexible will be pressed by the supporting member and become thinner when the second member is joined to the first member. This leads to, in some cases, a failure to secure a sufficient thickness for accommodating the difference in expansion coefficient between the second member and the first member.

Hence, the abutting member preferably contains magnetic substances more on the side thereof that is to be abutted on the first member than on the side adjacent to the supporting member. In this case, for example, the abutting member may include an abutting layer that is abutted on the first member and an interlayer disposed between the abutting layer and the supporting member, and only the abutting layer may contain the magnetic substances.

Therefore, when inductively heated as described above, the abutting member becomes softer and easily deforms at the side thereof adjacent to the first member, which contains the magnetic substance more, e.g., at the abutting layer, whereas the abutting member deforms less at the second member side, which relatively contains the magnetic substance less, e.g., at the interlayer, than at the first member side. This enables the abutting member to secure a sufficient thickness for accommodating the difference in expansion coefficient between the second member and the first member, thus making it possible to securely prevent the second member from coming off from the first member.

Further, since the second member has the supporting member composed of the second thermoplastic resin molding, the second member fails to provide sufficient shape-following capability with respect to the first member in some cases when the abutting member is joined to the first member. For this reason, the supporting member preferably includes therein an uncured thermosetting resin layer.

The supporting member includes therein the uncured thermosetting resin layer, which enables the supporting member to obtain appropriate plasticity to have sufficient shape-following capability with respect to the first member while maintaining the shape of the second member. The thermoplastic resin layer can be hardened by being heated in a post-process, such as a process for coating the reinforced member, thus allowing required strength to be imparted to the second member.

DESCRIPTION OF THE PREFERRED EMBODIMENTS

Embodiments of the present invention will now be described in detail with reference to the accompanying drawings.

Figure 1:
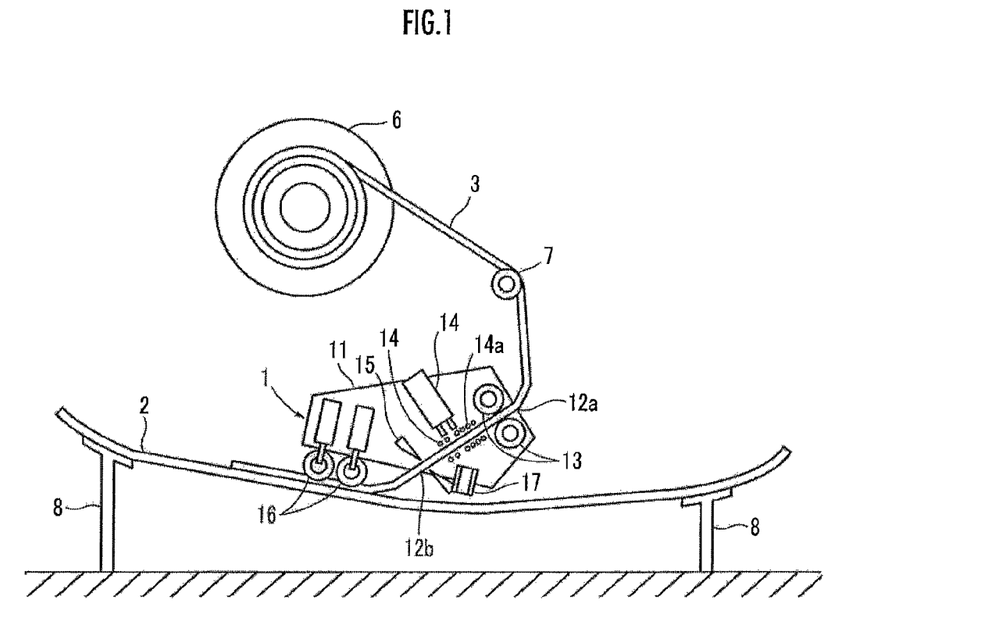
FIG. 1 is a side view illustrating a configuration example of a manufacturing apparatus used in a manufacturing method for a composite structure in accordance with the present invention.

A composite structure manufacturing apparatus 1 illustrated in FIG. 1 fabricates a composite structure by joining a ribbed second member (reinforcing member) 3 to one surface of a first member (a member to be reinforced), such as a 0.7 mm-thick steel metal plate 2. The metal plate 2 is used for example an auto exterior part.

A description will now be given of a first embodiment for fabricating the composite structure by using the composite structure manufacturing apparatus 1.

Figure 2:
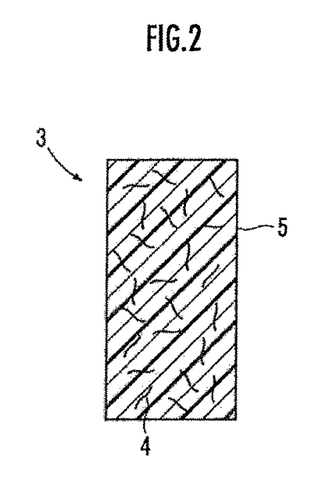
FIG. 2 is a schematic sectional view illustrating a first configuration example of a reinforcing member used in the manufacturing method for the composite structure in accordance with the present invention.

In the present embodiment, the reinforcing member 3 is composed of a long molding 5 made of a thermoplastic resin that contains therein magnetic substances 4 throughout, as illustrated in FIG. 2. Each of the magnetic substances 4 is a metal fiber that has, for example, a diameter of 80 to 150 μm and a length of 1 to 3 mm. The magnetic substances 4 are contained at a ratio of 30 to 60 percent by mass relative to the entire reinforcing member 3. The metal used for the metal fiber may be, for example, steel such as ferrite-based stainless steel, soft iron, iron steel, or nickel. A styrene-based elastomer, for example, may be used as the thermoplastic resin.

The reinforcing member 3 can be obtained, for example, as described below. First, a mixture of a pellet-like styrene-based elastomer and the magnetic substances 4 composed of metal fibers is melted and extrusion-molded into a bar-like shape, and the obtained extruded molding is cut into a pellet. Then, a molten resin obtained by melting the pellet is extrusion-molded into a plate-like shape through a die, and the plate-like molten resin is cooled and solidified, thereby fabricating the long reinforcing member 3.

The composite structure manufacturing apparatus 1 illustrated in FIG. 1 pulls out the long reinforcing member 3 wound around a bobbin 6 through a relay roller 7 and joins the reinforcing member 3 onto one surface of the metal plate 2 sequentially from the starting end toward the terminal end of the reinforcing member 3. The metal plate 2 is placed on jigs 8.

The composite structure manufacturing apparatus 1 is placed in a housing 11 and set to be movable by a robot (not shown) to an arbitrary position above the metal plate 2. The housing 11 has an inlet 12a through which the reinforcing member 3 is introduced and an outlet 12b through which the reinforcing member 3 is led out.

The composite structure manufacturing apparatus 1 has a pair of feeding rollers 13 serving as an introducing means for pulling out the reinforcing member 3 wound around the bobbin 6 and continuously introducing the reinforcing member 3 into the housing 11 through the inlet 12a. Provided on the downstream side of the feeding rollers 13 is an induction heater 14 serving as the induction heating apparatus that heats the reinforcing member 3 by induction heating to make the reinforcing member 3 weldable. Provided on the downstream side of the induction heater 14 is a cutter 15 that cuts the reinforcing member 3 at a predetermined position.

Further, the bottom portion of the housing 11 is provided with a pair of pressing rollers 16 serving as the pressing means that presses the reinforcing member 3, which has been led out through the outlet 12b, against the metal plate 2, and an atmospheric plasma cleaner 17 that degreases a surface of the metal plate 2 at below the induction heater 14.

According to the present embodiment, the induction heater 14 is provided with a first induction heating coil 14a and a second induction heating coil 14b as a plurality of induction heating units interconnected in series to a power source (not shown). The first induction heating coil 14a is provided adjacently to the end where the reinforcing member 3 is introduced, while the second induction heating coil 14b is provided adjacently to the end where the reinforcing member 3 is led out.

The first induction heating coil 14a has a higher magnetic flux density than that of the second induction heating coil 14b and is capable of heating the reinforcing member 3 at a higher heating rate than that of the second induction heating coil 14b. The magnetic flux density of the first induction heating coil 14a can be increased to be higher than that of the second induction heating coil 14b by, for example, increasing the number of turns per coil unit length or decreasing the coil length.

The induction heater 14 has the two induction heating coils, namely, 14a and 14b. However, the number of the induction heating coils, 14a and 14b, does not have to be two, insofar as the magnetic flux density increases toward the end where the reinforcing member 3 is introduced and decreases toward the end where the reinforcing member 3 is led out.

A description will now be given of the method for manufacturing a composite structure by the composite structure manufacturing apparatus 1. First, the reinforcing member 3, which is the long molding wound around the bobbin 6, is pulled out by the feeding rollers 13 through the relay roller 7 and continuously introduced into the first induction heating coil 14a and the second induction heating coil 14b of the induction heater 14.

Then, the reinforcing member 3 is inductively heated by the induction heater 14 to heat at least the portion of the reinforcing member 3, which is to be abutted on the metal plate 2, such that the portion becomes weldable. The reinforcing member 3 is heated to the temperature range of not lower than the softening temperature and below the temperature of deterioration of the thermoplastic resin by the heat generation of the magnetic substances 4 contained therein, which is caused by the induction heating.

More specifically, first, the reinforcing member 3 is heated at the introduction end by the first induction heating coil 14a at a high heating rate of, for example, 350° C./sec., to a temperature that is below the softening temperature of the thermoplastic resin but near the softening temperature thereof. Then, after the reinforcing member 3 is moved from the introduction end to the lead-out end, the reinforcing member 3 is heated at the lead-out end by the second induction heating coil 14b at a low heating rate of, for example, 200° C./sec.

At this time, the second induction heating coil 14b heats the reinforcing member 3 at the low heating rate, so that the reinforcing member 3 can be heated without reaching the temperature of deterioration of the thermoplastic resin under secure control of the temperature thereof to the temperature range of not less than the softening temperature of the thermoplastic resin and below the temperature of deterioration thereof.

Subsequently, the reinforcing member 3 with at least the portion thereof to be abutted on the metal plate 2 having been heated to be weldable is introduced into between the metal plate 2, which has been degreased by the atmospheric plasma cleaner 17, and the pressing rollers 16, 16. At this time, setting the angle, at which the reinforcing member 3 is fed to between the metal plate 2 and the pressing rollers 16, to a small angle makes it possible to reduce the stress developed due to the bending of the reinforcing member 3 at the angle, especially at the heated portion that is to be abutted on the metal plate 2.

Subsequently, the reinforcing member 3 that has been heated as described above is pressed against the surface of the metal plate 2 by the pressing rollers 16. At this time, the reinforcing member 3 has been heated by the induction heating such that at least the portion thereof that is to be abutted on the metal plate 2 is weldable. Therefore, the reinforcing member 3 can be joined to the one surface of the metal plate 2 by welding without heating the metal plate 2, thus allowing the reinforcing member 3 and the metal plate 2 to be combined into one piece to fabricate the composite structure.

Then, when the length of the reinforcing member 3 joined to the metal plate 2 approaches a predetermined length required for reinforcing the metal plate 2, the reinforcing member 3 is cut by the cutter 15, thereby stopping the introduction of the reinforcing member 3. Meanwhile, the reinforcing member 3 that has been cut is joined to the metal plate 2 by being pressed by the pressing rollers 16, 16. As a result, the reinforcing member 3 of the predetermined length and the metal plate 2 are joined into one piece, forming the composite structure.

The composite structure manufacturing apparatus 1 moves from the starting end to the terminal end of the reinforcing member 3, which is the long molding, through the robot (not shown) and repeatedly performs the foregoing operation while moving in the width direction of the metal plate 2.

According to the composite structure manufacturing apparatus 1 of the present embodiment, only the reinforcing member 3 is heated by the induction heating and the metal plate 2 is not heated at all, making it possible to prevent the metal plate 2 from deforming.

Further, the composite structure manufacturing apparatus 1 of the present embodiment has a plurality of induction heating coils 14a and 14b that have different temperature increasing rates. This make it possible to prevent the reinforcing member 3 from developing thermal deterioration caused by excessive heating and to securely control the temperature of the reinforcing member 3 to the temperature range of not less than the softening temperature of the thermoplastic resin and below the temperature of deterioration thereof.

A description will now be given of a second embodiment in which the composite structure is fabricated by using a composite structure manufacturing apparatus 1.

The present embodiment fabricates the composite structure by using exactly the same construction as that of the first embodiment except that the first induction heating coil 14a and the second induction heating coil 14b of the induction heater 14 illustrated in FIG. 1 are interconnected in parallel to a power source (not shown).

According to the composite structure manufacturing apparatus 1 of the present embodiment, the induction heating coils 14a and 14b are interconnected in parallel to the power source, so that the total value of the inductances can be reduced, as compared with the case where the induction heating coils 14a and 14b are interconnected in series. This permits a reduction in the voltage applied to the induction heating coils 14a and 14b, thus allowing the reinforcing member 3 to be heated to the temperature range of not lower than the softening temperature of the thermoplastic resin and below the temperature of deterioration thereof so as to be weldable without using a high voltage as the power source.

The number of the induction heating coils 14a and 14b interconnected in parallel is not limited to two, and may be provided in a number of 3 or more.

A description will now be given of a third embodiment in which the composite structure is fabricated by using a composite structure manufacturing apparatus 1.

Figure 3:
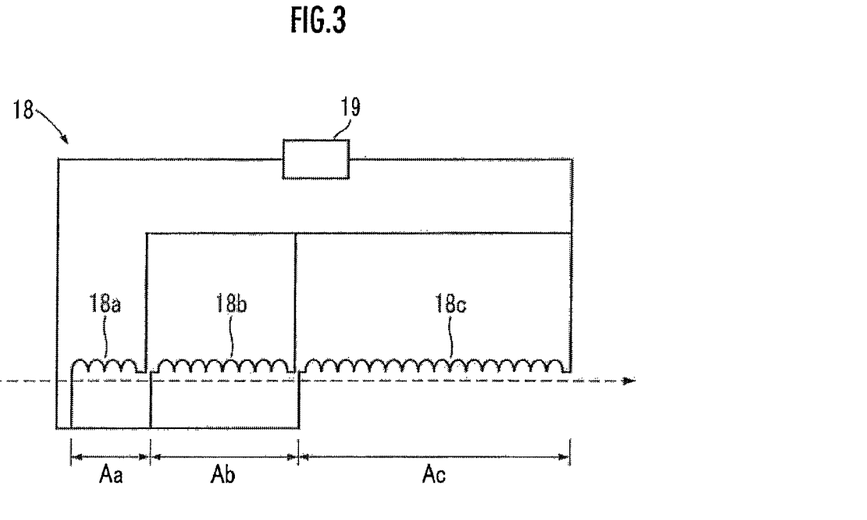
FIG. 3 is a schematic diagram illustrating a first arrangement example of induction heating coils in the manufacturing apparatus illustrated in FIG. 1.

According to the present embodiment, in the composite structure manufacturing apparatus 1 illustrated in FIG. 1, an induction heater 18 equipped with three induction heating coils 18a, 18b, and 18c, each of which has a different heating rate as illustrated in FIG. 3, is used in place of the induction heater 14 equipped with the induction heating coils 14a and 14b. The composite structure manufacturing apparatus 1 used in the present embodiment indicates exactly the same construction as that of the composite structure manufacturing apparatus 1 illustrated in FIG. 1 except that the induction heater 18 is used instead of the induction heater 14.

In the present embodiment, the combination of the three induction heating coils 18a, 18b, and 18c, each of which has a different heating rate, makes it possible to control the heating rates in a low temperature range and a high temperature range, respectively, when heating a reinforcing member 3.

As illustrated in FIG. 3, the induction heater 18 of the present embodiment has the first induction heating coil 18a, the second induction heating coil 18b, and the third induction heating coil 18c in this order from the introduction end to the lead-out end of the reinforcing member 3 along the direction (arrowed by the dashed line) in which the reinforcing member 3 is moved. The induction heating coils 18a, 18b, and 18c are interconnected in parallel to a power source 19.

The induction heating coils 18a, 18b, and 18c all share the same conductor diameter, the same coil radius, and the same number of turns per coil unit length, and differ only in the coil lengths thereof. Coil lengths Aa, Ab, and Ac of the induction heating coils 18a, 18b, and 18c are set to have a relationship denoted by Aa<Ab<Ac, so that the magnetic flux density becomes higher toward the end where the reinforcing member 3 is introduced, while the magnetic flux density becomes lower toward the end where the reinforcing member 3 is led out.

The reinforcing member 3 is heated by the induction heating coils 18a, 18b, and 18c in this order while being moved from the introduction end to the lead-out end. The temperature changes in the reinforcing member 3 and magnetic substances 4 during the heating are illustrated in FIG. 4.

Figure 4:
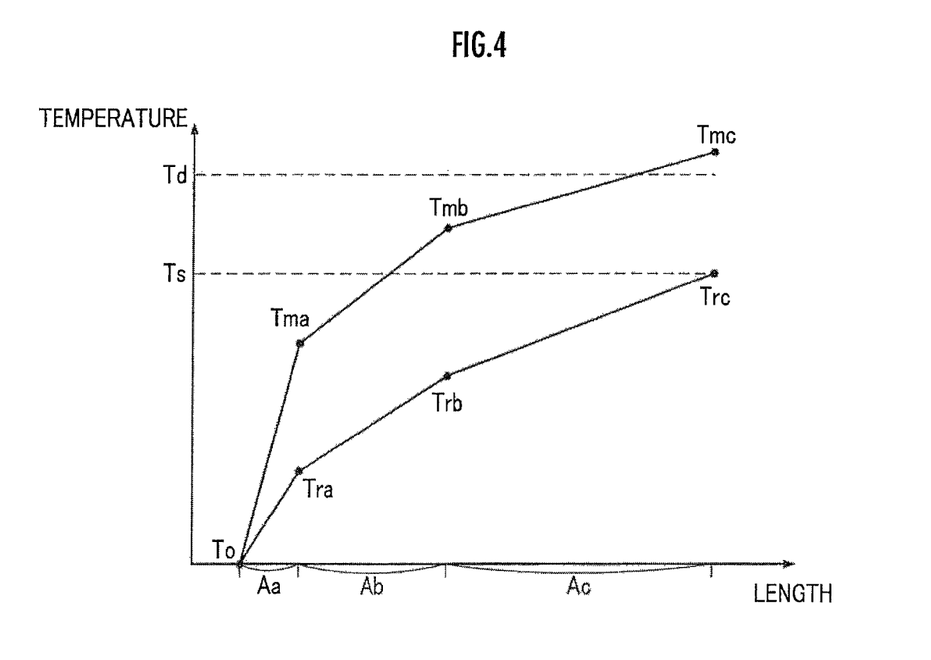
FIG. 4 is a graph illustrating temperature changes in magnetic substances and a thermoplastic resin molding heated by the induction heating coils illustrated in FIG. 3.

As illustrated in FIG. 4, the temperatures of the reinforcing member 3 and the magnetic substances 4 immediately before the reinforcing member 3 is introduced into the first induction heating coil 18a are both temperature To. Then, the reinforcing member 3 is introduced into and passed through the first induction heating coil 18a. This causes the magnetic substances 4 to be inductively heated to temperature Tma by the first induction heating coil 18a. As a result, the reinforcing member 3 is heated to temperature Tra.

Subsequently, the reinforcing member 3 is introduced into and passed through the second induction heating coil 18b. This causes the magnetic substances 4 to be inductively heated to temperature Tmb by the second induction heating coil 18b. As a result, the reinforcing member 3 is heated to temperature Trb.

At this time, the magnetic flux density of the second induction heating coil 18b is lower than that of the first induction heating coil 18a, so that the heating rate of the second induction heating coil 18b is lower than that of the first induction heating coil 18a. Thus, the induction heating carried out using the induction heating coil 18a and then the induction heating coil 18b makes it possible to control temperature Trb of the reinforcing member 3 to a temperature range below softening temperature Ts but near the softening temperature Ts of the thermoplastic resin constituting the reinforcing member 3.

Subsequently, the reinforcing member 3 is introduced into and passed through the third induction heating coil 18c. This causes the magnetic substances 4 to be inductively heated to temperature Tmc by the third induction heating coil 18c. As a result, the reinforcing member 3 is heated to temperature Trc.

At this time, the magnetic flux density of the third induction heating coil 18c is further lower than that of the second induction heating coil 18b, so that the heating rate of the third induction heating coil 18c is further lower than that of the second induction heating coil 18b. Thus, the induction heating carried out using the induction heating coil 18b and then the induction heating coil 18c makes it possible to securely control temperature Trc of the reinforcing member 3 to a temperature range of not lower than the softening temperature Ts of the thermoplastic resin and below temperature of deterioration Td thereof.

The number of the induction heating coils 18a, 18b, and 18c which has a different heating rate is not limited to three, and may be provided in two, or in a number of 3 or more. Further, the length of the coils may be identical for the induction heating coils 18a, 18b, and 18c, and the magnetic flux density thereof may be changed by differing a diameter of a wire constituting the coil, the radius of the coil or the number of turns per coil unit length.

A description will now be given of a fourth embodiment in which the composite structure is fabricated by using a composite structure manufacturing apparatus 1.

Figure 5:
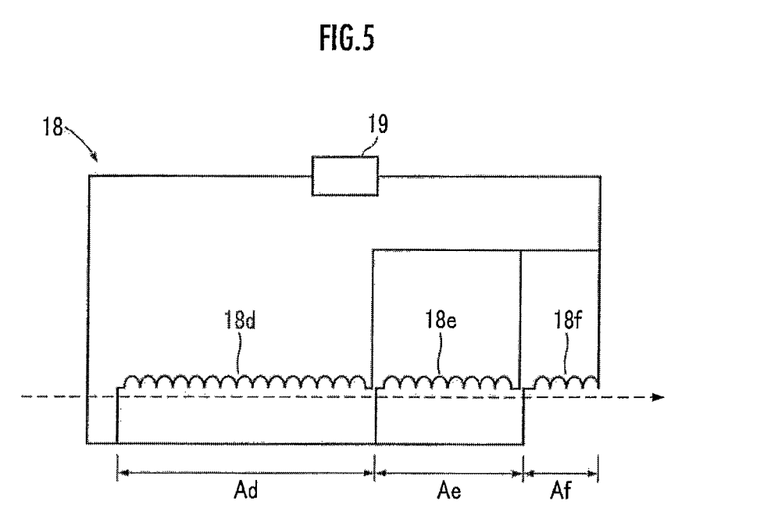
FIG. 5 is a schematic diagram illustrating a second arrangement example of the induction heating coils in the manufacturing apparatus illustrated in FIG. 1.

According to the present embodiment, in the composite structure manufacturing apparatus 1 illustrated in FIG. 1, an induction heater 18 equipped with three induction heating coils 18d, 18e, and 18f, each of which has a different heating rate as shown in FIG. 5, is used in place of the induction heater 14 equipped with the induction heating coils 14a and 14b. The composite structure manufacturing apparatus 1 used in the present embodiment has exactly the same construction as that of the composite structure manufacturing apparatus 1 illustrated in FIG. 1 except that the induction heater 18 is used instead of the induction heater 14.

In the present embodiment, the combination of the three induction heating coils 18d, 18e, and 18f, each of which has a different heating rate, makes it possible to control the heating rates in a low temperature range and a high temperature range, respectively, when heating a reinforcing member 3.

As illustrated in FIG. 5, the induction heater 18 of the present embodiment has the first induction heating coil 18d, the second induction heating coil 18e, and the third induction heating coil 18f in this order from the introduction end to the lead-out end of the reinforcing member 3 along the direction (arrowed by the dashed line) in which the reinforcing member 3 is moved. The induction heating coils 18d, 18e, and 18f are interconnected in parallel to a power source 19.

The induction heating coils 18d, 18e, and 18f all share the same conductor diameter, the same coil radius, and the same number of turns per coil unit length, and differ only in the coil lengths thereof. Coil lengths Ad, Ae, and Af of the induction heating coils 18d, 18e, and 18f are set to have a relationship denoted by Ad>Ae>Af, so that the magnetic flux density becomes lower toward the end where the reinforcing member 3 is introduced, while the magnetic flux density becomes higher toward the end where the reinforcing member 3 is led out.

The number of the induction heating coils 18d, 18e, and 18f which has a different heating rate is not limited to three, and may be provided in two, or in a number of 3 or more. Further, the length of the coils may be identical for the induction heating coils 18d, 18e, and 18f, and the magnetic flux density thereof may be changed by differing a diameter of a wire constituting the coil, the radius of the coil or the number of turns per coil unit length.

The reinforcing member 3 is heated by the induction heating coils 18d, 18e, and 18f in this order while being moved from the introduction end to the lead-out end. The temperature changes in the reinforcing member 3 and magnetic substances 4 during the heating are illustrated in FIG. 6.

Figure 6:
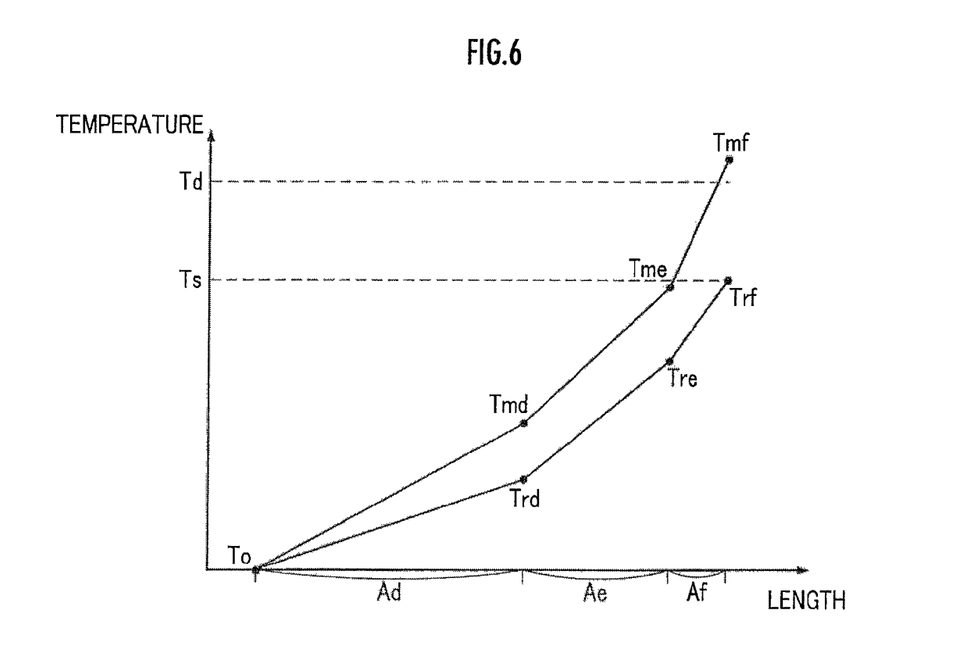
FIG. 6 is a graph illustrating temperature changes in magnetic substances and a thermoplastic resin molding heated by the induction heating coils illustrated in FIG. 5.

As illustrated in FIG. 6, the temperatures of the reinforcing member 3 and the magnetic substances 4 immediately before the reinforcing member 3 is introduced into the first induction heating coil 18d are both temperature To. Then, the reinforcing member 3 is introduced into and passed through the first induction heating coil 18d. This causes the magnetic substances 4 to be inductively heated to temperature Tmd by the first induction heating coil 18d. As a result, the reinforcing member 3 is heated to temperature Trd.

Subsequently, the reinforcing member 3 is introduced into and passed through the second induction heating coil 18e. This causes the magnetic substances 4 to be inductively heated to temperature Tme by the second induction heating coil 18e. As a result, the reinforcing member 3 is heated to temperature Tre.

At this time, the magnetic flux density of the second induction heating coil 18e is higher than that of the first induction heating coil 18d, so that the heating rate of the second induction heating coil 18e is higher than that of the first induction heating coil 18d. Thus, the induction heating carried out using the induction heating coil 18d and then the induction heating coil 18e makes it possible to promptly heat the reinforcing member 3 and to control temperature Tre thereof to a temperature range below softening temperature Ts but near the softening temperature Ts of the thermoplastic resin constituting the reinforcing member 3.

Subsequently, the reinforcing member 3 is introduced into and passed through the third induction heating coil 18f. This causes the magnetic substances 4 to be inductively heated to temperature Tmf by the third induction heating coil 18f. As a result, the reinforcing member 3 is heated to temperature Trf.

At this time, the magnetic flux density of the third induction heating coil 18f is further higher than that of the second induction heating coil 18e, so that the heating rate of the third induction heating coil 18f is further higher than that of the second induction heating coil 18e. Thus, the induction heating carried out using the induction heating coil 18e and then the induction heating coil 18f makes it possible to promptly heat the reinforcing member 3 and to securely control temperature Trf thereof to a temperature range of not lower than softening temperature Ts of the thermoplastic resin and below temperature of deterioration Td.

The present embodiment is capable of promptly heating the reinforcing member 3 in the high temperature range near softening temperature Ts of the thermoplastic resin, thus permitting shortened heating time of the reinforcing member 3 in the high temperature range.

In the embodiments, the reinforcing member 3 formed of the long molding 5 is heated to be weldable and then the reinforcing member 3 is cut to the predetermined length in the step for joining the reinforcing member 3 to the metal plate 2. Alternatively, however, in the foregoing embodiments, the reinforcing member 3 composed of a molding that has been cut to a predetermined length beforehand may be heated to be weldable and then joined to the metal plate 2.

Further, in the foregoing embodiments, the metal plate 2 is used as the member to be reinforced. Alternatively, however, a plastic board may be used in place of the metal plate 2.

Further, in all the foregoing embodiments, the reinforcing member 3 containing the magnetic substances 4 in the entire long molding 5 made of a thermoplastic resin, as illustrated in FIG. 2, is used. Alternatively, however, a reinforcing member 31 illustrated in FIG. 7 may be used. The reinforcing member 31 is composed of a long molding 5 having a two-layer structure in which a supporting member 52 is laminated on an abutting member 51, which is to be abutted on the metal plate 2.

Figure 7:
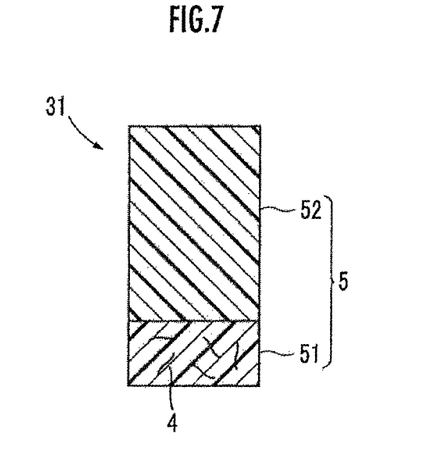
FIG. 7 is a schematic sectional view illustrating a second configuration example of a reinforcing member used in the manufacturing method for a composite structure in accordance with the present invention.

The reinforcing member 31 is not limited to the two-layer structure, and the supporting member 42 may be provided in a layer of 3 or more on the abutting member 51.

In the reinforcing member 31, the abutting member 51 is formed of a thermoplastic resin, such as a styrene-based elastomer, and the magnetic substances 4 are dispersed therein. Each of the magnetic substances 4 is a metal fiber that has, for example, a diameter of 80 to 150 μm and a length of 1 to 3 mm. The magnetic substances 4 are contained at a ratio of 30 to 60 percent by mass relative to the entire abutting member 51. The metal used as the metal fiber may be, for example, steel such as ferrite-based stainless steel, soft iron, iron steel, or nickel.

Meanwhile, the supporting member 52 is made of a thermoplastic resin, such as nylon 6, which contains 20 percent by mass of glass fiber. In the reinforcing member 31 therefore, the abutting member 51 constitutes a thermoplastic resin (styrene-based elastomer) molding that has higher flexibility than the supporting member 52.

According to the reinforcing member 31, the supporting member 52 does not have to be heated insofar as the abutting member 51 is heated to be weldable to the metal plate 2. This permits reduced energy required for heating.

The reinforcing member 31 can be obtained, for example, as described below. First, a mixture of a pellet-like styrene-based elastomer and the magnetic substances 4 composed of metal fibers is melted and extrusion-molded into a bar-like shape, and the obtained extruded molding is cut into a first pellet. Then, the first pellet and a second pellet composed of nylon 6 that contains glass fiber are respectively melted.

Subsequently, a first molten resin obtained by melting the first pellet is extrusion-molded into a plate-like shape through one of two dies, which are provided in a vertically stacked manner, thereby to form the abutting member 51. At the same time, a second molten resin obtained by melting the second pellet is extrusion-molded into a plate-like shape through the other die thereby to form the supporting member 52 on the abutting member 51. Then, by cooling and solidifying the abutting member 51 and the supporting member 52, the long reinforcing member 31 having the two layers composed of the abutting member 51 and the supporting member 52 can be obtained.

The reinforcing member 31 is not limited to the two-layer structure, and the supporting member 42 may be provided in a layer of 3 or more on the abutting member 51.

Figure 8:
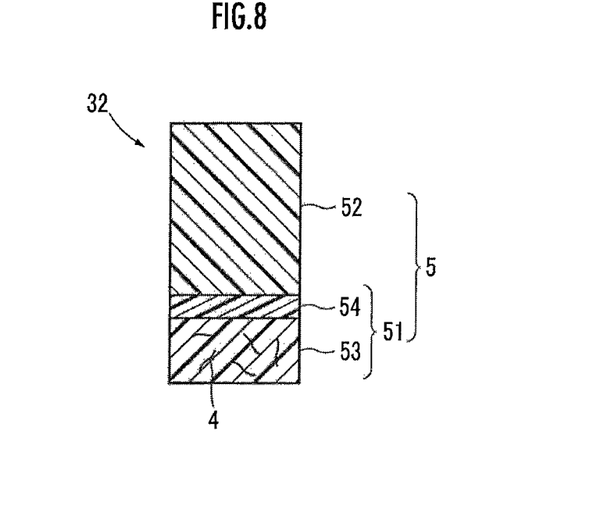
FIG. 8 is a schematic sectional view illustrating a third configuration example of a reinforcing member used in the manufacturing method for a composite structure in accordance with the present invention.

Further, in place of the reinforcing member 31 illustrated in FIG. 7, a reinforcing member 32 illustrated in FIG. 8 may be used. The reinforcing member 32 has an abutting member 51 composed of an abutting layer 53 to be abutted on the metal plate 2 and an interlayer 54 disposed between the abutting layer 53 and the supporting member 52 in the reinforcing member 31 illustrated in FIG. 7, and only the abutting layer 53 contains the magnetic substances 4.

In the reinforcing member 32, the abutting layer 53 and the interlayer 54 are made of the same thermoplastic resin, such as a styrene-based elastomer. The abutting layer 53 contains, for example, 30 to 60 percent by mass of the magnetic substances 4 relative to the entire abutting layer 53, whereas the interlayer 54 does not contain the magnetic substances 4 at all.

Therefore, in the reinforcing member 32, the abutting member 51 contains the magnetic substances 4 more on the side that is to be abutted on the metal plate 2 than on the side adjacent to the supporting member 52. As the magnetic substances 4, the same material as that in the case of the reinforcing member 31 may be used.

The reinforcing member 32 is not limited to the three-layer structure, and the supporting member 52 may be provided in a layer of 3 or more on the abutting layer 53 with the intermediary of the interlayer 54.

When the reinforcing member 31 is joined to the metal plate 2, the abutting member 51 that has been softened is pressed by pressing rollers 16, 16 through the intermediary of the supporting member 52. This causes the thickness of the abutting member 51 to be reduced, and a sufficient thickness for accommodating the difference in the expansion coefficient between the reinforcing member 31 and the metal plate 2 may not be obtained in some cases.

According to the reinforcing member 32, however, when the induction heating is carried out as in the embodiments described above, the abutting layer 53, which contains the magnetic substances 4, further softens and becomes easy to deform, whereas the interlayer 54, which does not contain the magnetic substances 4 at all, becomes more difficult to deform than the abutting layer 53. Hence, the abutting member 51 enables the reinforcing member 32 to secure a sufficient thickness for accommodating the difference in the expansion coefficient between the reinforcing member 32 and the metal plate 2, thus making it possible to securely prevent the reinforcing member 32 from coming off from the metal plate 2.

The reinforcing member 32 can be obtained, for example, as described below. First, a mixture of a pellet-like styrene-based elastomer and the magnetic substances 4 composed of metal fibers is melted and extrusion-molded into a bar-like shape, and the obtained extruded molding is cut into a first pellet. Then, the first pellet, a second pellet composed only of a styrene-based elastomer, and a third pellet composed of nylon 6, which contains glass fiber, are respectively melted.

Subsequently, a first molten resin obtained by melting the first pellet is extrusion-molded into a plate-like shape through one of three dies, which are provided in a vertically stacked manner, thereby to form the abutting layer 53. At the same time, a second molten resin obtained by melting the second pellet is extrusion-molded into a plate-like shape through a second die thereby to form the interlayer 54 on the abutting layer 53. Further at the same time, a third molten resin obtained by melting the third pellet is extrusion-molded into a plate-like shape through a third die thereby to form the supporting member 52 on the interlayer 54.

Then, by cooling and solidifying the obtained laminate, the reinforcing member 32 formed of the long molding 5 having the three layers of the abutting layer 53, the interlayer 54, and the supporting member 52 can be obtained.

Figure 9:
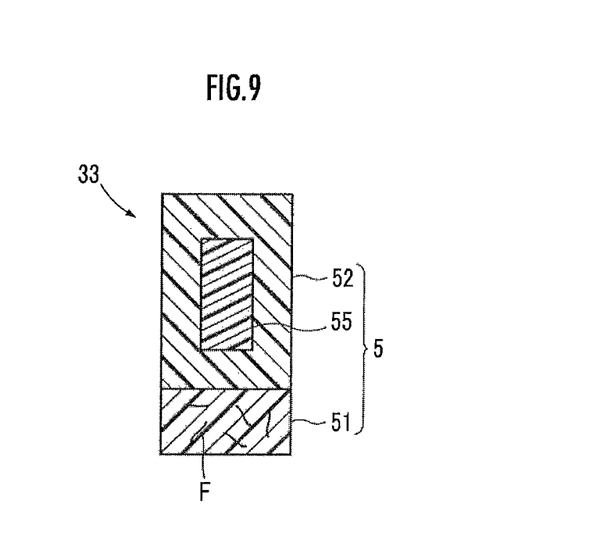
FIG. 9 is a schematic sectional view illustrating a fourth configuration example of a reinforcing member used in the manufacturing method for a composite structure in accordance with the present invention.

Further, in place of the reinforcing member 31 illustrated in FIG. 7, a reinforcing member 33 illustrated in FIG. 9 may be used. The reinforcing member 33 is constructed such that the supporting member 52 includes therein an uncured thermosetting resin layer 55 in the reinforcing member 31 illustrated in FIG. 7.

The reinforcing member 31 has the supporting member 52 composed of nylon 6, which contains the glass fiber. The supporting member 52 has higher hardness than the abutting member 51 composed of a styrene-based elastomer. For this reason, the reinforcing member 31 may fail, in some cases, to exhibit a sufficient shape-following capability in the supporting member 52 when the abutting member 51 is welded to the metal plate 2.

According to the reinforcing member 33, however, the uncured thermosetting resin layer 55 included in the supporting member 52 permits appropriate flexibility, thus making it possible to obtain sufficient shape-following capability relative to the metal plate 2 while maintaining the shape thereof. The thermosetting resin layer 55 can be hardened by being heated in a post-process, such as a process for coating the metal plate 2, thus allowing required strength to be imparted to the reinforcing member 33.

The reinforcing member 33 can be obtained, for example, as described below. First, a mixture of a pellet-like styrene-based elastomer and the magnetic substances 4 composed of metal fibers is melted and extrusion-molded into a bar-like shape, and the obtained extruded molding is cut to obtain a first pellet. Then, the first pellet and a second pellet composed of nylon 6 that contains glass fiber are respectively melted.

Subsequently, a first molten resin obtained by melting the first pellet is extrusion-molded into a plate-like shape through one of two dies, which are provided in a vertically stacked manner, thereby to form the abutting member 51. At the same time, a second molten resin obtained by melting the second pellet is extrusion-molded into a plate-like shape, which has therein a cavity extending in the direction of the length, through the other die thereby to form the supporting member 52 on the abutting member 51.

Then, the obtained laminate is cooled and solidified and the cavity is filled with the uncured thermosetting resin thereby to form the uncured thermosetting resin layer 55.

Thus, the reinforcing member 33 is obtained.

What is claimed is:

1. A manufacturing method for a composite structure composed of a plate-like first member and a ribbed second member, the method comprising:
a step of introducing a thermoplastic resin molding into an induction heating apparatus, in which the thermoplastic resin includes an abutting portion, which is to be abutted on one surface of the first member, and contains a magnetic substance at least in the abutting portion, the thermoplastic resin molding constituting the second member;
a step of heating the abutting portion by inductively heating the second member by the induction heating apparatus; and
a step of leading the second member out of the induction heating apparatus and joining the second member to one surface of the first member at the abutting portion,
wherein the induction heating apparatus is composed of a plurality of induction heating units, and all of the plurality of heating units are provided continuously,
wherein the second member has a two-layer structure in which a supporting member composed of a second thermoplastic resin molding is laminated on an abutting member composed of a first thermoplastic resin molding, and the abutting member contains the magnetic substance, and
wherein the abutting member is composed of a thermoplastic resin molding that has higher flexibility than that of the supporting member.

2. The manufacturing method for the composite structure according to claim 1, wherein the plurality of the induction heating units heats the second member at heating rates that differ from each other.

3. The manufacturing method for the composite structure according to claim 2, wherein the plurality of the induction heating units increases the temperature of the second member at a lower heating rate toward an end where the second member is introduced and increases the temperature of the second member at a higher heating rate toward an end where the second member is led out.

4. The manufacturing method for the composite structure according to claim 2, wherein the plurality of the induction heating units heats the second member at a higher heating rate toward the end where the second member is introduced and heats the second member at a lower heating rate toward the end where the second member is led out.

5. The manufacturing method for the composite structure according to claim 1, wherein the abutting member contains the magnetic substance more at an end where the abutting member is abutted on the first member than an end thereof adjacent to the supporting member.

6. The manufacturing method for the composite structure according to claim 5, wherein the abutting member has an abutting layer to be abutted on the first member and an interlayer disposed between the abutting layer and the supporting member, and only the abutting layer contains the magnetic substance.

7. The manufacturing method for the composite structure according to claim 1, wherein the second member is a long body.

8. The manufacturing method for the composite structure according to claim 1, wherein the second member has a length required for reinforcing the first member.

9. The manufacturing method for the composite structure according to claim 1, wherein the induction heating apparatus heats the abutting portion to a temperature range of not lower than a softening temperature of the thermoplastic resin constituting the second member and below a temperature of deterioration thereof.

10. The manufacturing method for the composite structure according to claim 1, wherein the plurality of the induction heating units is interconnected in series.

11. The manufacturing method for the composite structure according to claim 1, wherein the plurality of the induction heating units is interconnected in parallel.

12. The manufacturing method for the composite structure according to claim 1, wherein the second member contains therein the magnetic substance throughout.

13. The manufacturing method for the composite structure according to claim 1, wherein the supporting member includes therein an uncured thermosetting resin layer.

* * * * *